United States Patent [19]
Gray et al.

[11] Patent Number: 5,233,742
[45] Date of Patent: Aug. 10, 1993

[54] METHOD AND APPARATUS FOR CONTROLLING TUBULAR CONNECTION MAKE-UP

[76] Inventors: N. Monroe Gray, 502 Westmont Dr., Houston, Tex. 77015; Earl L. Magee, 16111 Spinnaker, Crosby, Tex. 77532

[21] Appl. No.: 905,356

[22] Filed: Jun. 29, 1992

[51] Int. Cl.$^5$ ............................................. B23Q 17/00
[52] U.S. Cl. ........................................ 29/407; 29/456; 29/237; 29/240; 29/707
[58] Field of Search ................. 29/407, 456, 705, 707, 29/714, 237, 240, 709; 285/93, 333, 334

[56] References Cited

U.S. PATENT DOCUMENTS

| | | | |
|---|---|---|---|
| 3,606,664 | 9/1971 | Weiner | 29/407 |
| 3,745,820 | 7/1973 | Weiner | 81/469 |
| 4,365,402 | 12/1982 | McCombs et al. | 29/407 |
| 4,402,052 | 8/1983 | Stone et al. | 29/240 |
| 4,962,579 | 10/1990 | Moyer et al. | 29/407 |

*Primary Examiner*—P. W. Echols
*Assistant Examiner*—David P. Bryant
*Attorney, Agent, or Firm*—Jack A. Kanz

[57] ABSTRACT

Make-up of a pipe section and coupling to form a tubular joint having proper stand-off at proper make-up torque is automatically controlled. The coupling is first rotated onto the pipe section to a hand-tight position and the length of the coupling and the distance from the open end of the coupling to the pin end of the pipe section are measured by a digital measuring device which inputs these measurements to a computer. The number of turns of the coupler required to attain optimum stand-off is calculated by the computer. The pipe section is held stationary and power tongs rotate the coupling further onto the pipe section while the applied torque and the number of turns are measured and provided as inputs to the computer. The computer determines that the made up tubular joint is acceptable or not acceptable during the rotation by determining if the stand-off is within a predetermined make-up stand-off range at the same time that the make-up torque is within a predetermined make-up torque range.

27 Claims, 5 Drawing Sheets

METHOD AND APPARATUS FOR CONTROLLING TUBULAR CONNECTION MAKE-UP

BACKGROUND OF THE INVENTION

This invention relates in general to tapered threaded pipe joints. More particularly, but not by way of limitation, it relates to methods and apparatus for controlled joining or make-up of tapered, threaded pins and boxes.

Pipe sections in lengths of about twenty-six (26) feet to about forty-five (45) feet with outside diameters of about 2⅜ inches to about 20 inches are commonly used in drilling, completion and production of oil and gas wells. The pipe, depending on the outside diameter, is referred to as casing or tubing and also broadly identified as OCTG (Oil Country Tubular Goods). The lengths of pipe with larger outside diameters, called casing, are run inside the well bore during the drilling process. The purpose of casing is to hold the walls of the well bore in place, separate formations, provide an interior space for completion and production operations and seal off formation pressures from the well bore. Tubing is installed inside the cased well bore for the purpose of bringing oil and gas to the surface from the well depths. These lengths of pipe usually have tapered, exteriorly-threaded male ends called "pin threads" or "pin ends". Such ends are threaded into couplings or collars (which are short female pipe sections, the threaded portions of which are often called "boxes"), there being an interiorly-threaded tapered box region at each end of each coupling or collar. Each thread has various thread elements which must be machined to close tolerances so that when the pipe and couplings are made up (coupled together or formed), one continuous pressure vessel is formed.

Tapered, threaded joints are very difficult to make up (form) properly. For example, because the male and female threaded regions are tapered (frustoconical), there can only be a certain amount of penetration of the pin end into the box of the coupling before permanent deformation of the threads occurs. Such permanent deformation is not desired for various reasons including the fact that the pin end and coupling are not reusable. In extreme cases the coupling may split. Conversely, however, there must be sufficient penetration to achieve good sealing against gas or oil leakage, to achieve adequate resistance to axial tensile stresses, etc.

The success of a connection or a made up joint, when the threads are machined to proper tolerances, is reliant on other factors to provide a leak-proof connection or make-up. There are basically three major factors or variables which determine whether or not suitable seal of mating threads can be obtained and the joint between two tapered pipe sections is correctly made. The first factor or variable is the American Petroleum Institute (API) Modified Thread Compound used to lubricate and provide solids to fill the voids within joining threads (see API Bulletin 5a2). The second factor or variable is application of the correct amount of torque to join the two threaded surfaces. Torque is the measurement of force in foot-pounds required to overcome resistance generated by interference between pin and box threads during make-up. Make-up torque is namely the torque which exists at the very last increment of the make-up procedure. Proper make-up torque for round thread casing and tubing is identified in API Bulletin 5C3-9.1, which is hereby incorporated by reference as though fully set forth herein, and calculated from formula 4.1.2 for joint strength in the same bulletin. Minimum, optimum and maximum torque values are listed in API Bulletin 5C1 which is also hereby incorporated by reference as though fully set forth herein. The third factor or variable is the amount of stand-off as measured linearly from the coupling field end (open end of the coupling) to the pin end of the pipe after proper make-up. Stand-off is related to the amount of penetration of the pin end into the coupling.

Several methods have been used to monitor and control make-up of oil field tubular connections. One approach is the "torque-only" method based on read-out of a load cell attached to the power tongs and calibrated for torque. Another approach is the "torque-turn" method based on a reference torque. For example, U.S. Pat. No. 3,745,820 discloses method and apparatus for controlling pipe make-up which uses a predetermined reference torque. A torque panel meter and three control knobs allow an operator to input the predetermined reference torque, the minimum torque required for make-up and the maximum allowable torque. Three "turns" setting controls allow an operator to input low number of turns, intermediate number of turns and maximum number of turns. After this predetermined reference torque is reached during the rotation of the pipe, the torque is monitored together with the number of turns of the pipe to determine acceptability of the make-up.

U.S. Pat. No. 4,962,579 discloses a method of connecting threaded pipe sections in which a registry mark of a prescribed width is placed at a predetermined position on the exterior surface of a pin member. The pin member and a box member are continuously screwed together until the torque is within a predetermined make-up torque range. The location of the face of the box member is then observed to determine if the face of the box member is located within the width of the registry mark for an acceptably made up joint. If not, the joint is rejected.

Although it has long been known that both proper degree of penetration of the pipe section into the coupling and proper torque value at the proper degree of penetration must be achieved, present methods of make-up do not now achieve these factors jointly with any degree of regularity. The present invention provides apparatus and method for precisely controlling the make-up of tubular connections by combining applied torque and stand-off tolerances to achieve an ideal interference fit.

SUMMARY OF THE INVENTION

In accordance with the present invention, methods and apparatus for connecting a pipe section and a coupling to form a made up tubular joint having proper stand-off at proper make-up torque are provided. The coupling is first rotated onto the pipe section to a hand-tight position. The length of the coupling and the distance from the open end of the coupling to the pin end of the pipe section are measured by a digital measuring device which inputs these measurements to a computer. Using these measurements, the number of complete turns of the coupler which are required to attain optimum stand-off is calculated by the computer. While the pipe section is held stationary, power tongs rotate the coupling further onto the pipe section while the applied torque and the number of turns are measured and provided as inputs to the computer. The computer determines that the made up tubular joint is acceptable during the continuous rotation when the stand-off is within a predetermined make-up stand-off range at the same time that the make-up torque is within a predetermined make-up torque range. Consequently, the computer determines that the made up tubular joint should be rejected when either the stand-off is less than a maximum stand-off value but is outside the predetermined make-up stand-off range while the make-up torque is within the predetermined make-up torque range or the stand-off is within the predetermined make-up stand-off range while the make-up torque is greater than a minimum torque value but is outside the predetermined make-up torque range. The computer then sends a signal to the power tongs to terminate rotation of the coupler.

BRIEF DESCRIPTION OF THE DRAWING

Other advantages and features of the invention will become more readily understood from the following detailed description of a presently preferred embodiment thereof taken in connection with the accompanying drawing, wherein like reference numerals have been applied to like elements, in which.

DESCRIPTION OF THE PREFERRED EMBODIMENT

A made up tubular joint embodying the present invention is shown in various stages in FIGS. 1, 2 and 3 and will be discussed in detail below. It is to be understood that the present invention can be used with tubing or casing. It can be used with a tubular pipe, a coupling, collar or conventional box member and is advantageously used with a tapered threaded and coupled connection which achieves its connection without internal, external or mid-section torque shoulders. This tapered connection, as shown in FIGS. 1, 2 and 3, achieves its desired sealing at proper stand-off at proper make-up torque.

Figure 1:
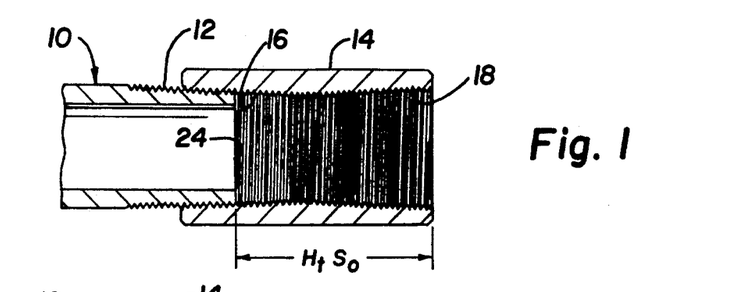
FIG. 1 is a simplified illustration of a tubular joint shown in sectional view which shows the hand-tight position of the coupling and tubular pipe.

As illustrated in FIG. 1, a first pipe section 10 having a tapered, exteriorly-threaded male end 12 is threadably rotated into second pipe section or coupler 14 having a first tapered, interiorly-threaded female end 16 to a hand-tight position. It will be appreciated that hand-tight position refers to the position of the second pipe section or coupler 14 on the first pipe section 10 when the second pipe section or coupler 14 has been rotated or screwed onto the first pipe section 10 as far as possible by hand torque only to provide a hand-tight stand-off ($H_tS_o$) as the distance measured from the open end 22 of second pipe section or coupler 14 to the pin end 24 of first pipe section 10. It will also be appreciated that second pipe section or coupler 14 has a second tapered, interiorly-threaded female end 18 positioned at the opposite end of second pipe section or coupler 14 from the first tapered, interiorly-threaded female end 16.

Figure 2:
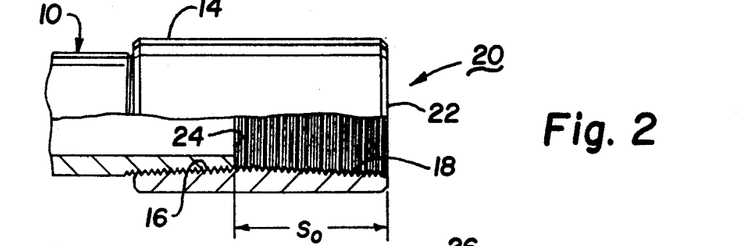
FIG. 2 is a simplified illustration of a tubular joint shown in partial sectional view showing the made up tubular joint as completed in accordance with the present invention.

FIG. 2 shows a made up tubular joint 20 having proper stand-off $S_o$ at proper make-up torque resulting from using the present invention. It will be appreciated that stand-off $S_o$ is the distance from the open end 22 of second pipe section or coupler 14 to the pin end 24 of first pipe section 10. The second pipe section or coupler 14 is normally installed on one end of the first pipe section 10 before shipment to the well site.

Figure 3:
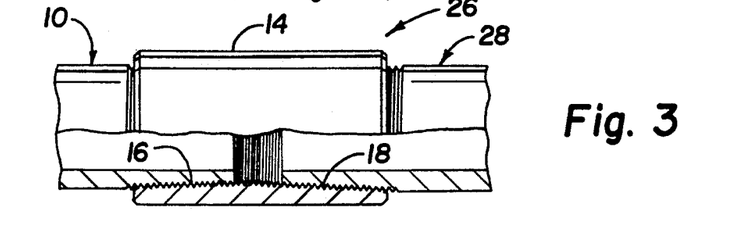
FIG. 3 is a simplified illustration of a tubular joint shown in partial sectional view showing one continuous pressure vessel formed by two tubular pipes and a coupling.

FIG. 3 shows a made up tubular joint 26 having a first pipe section 10 and a third pipe section 28 threadably rotated into opposite ends of second pipe section or coupler 14 to form one continuous pressure vessel.

Figure 4:
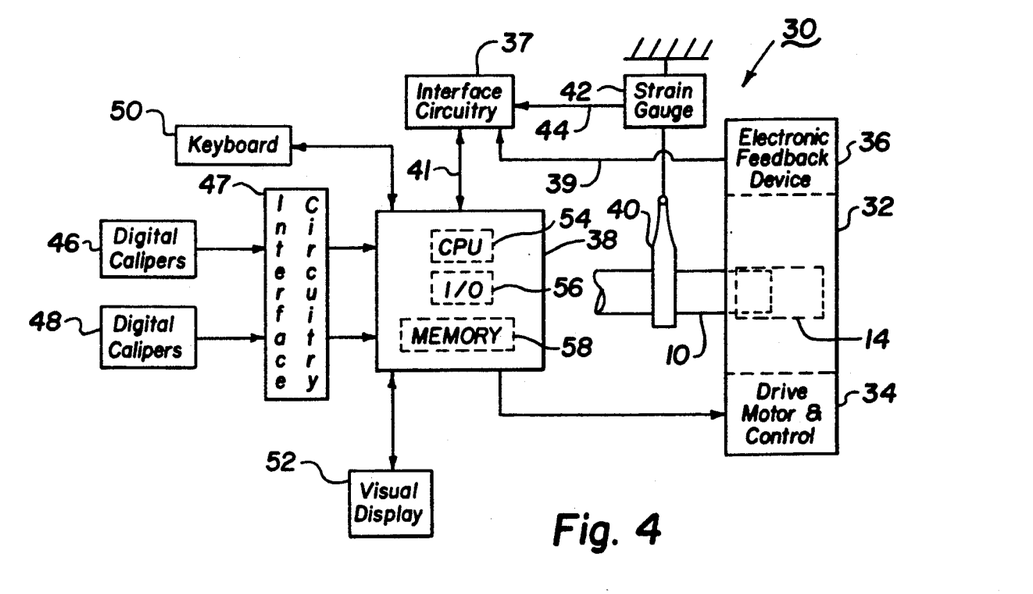
FIG. 4 is a simplified schematic diagram showing apparatus for controlling make-up of tubular connections in accordance with the present invention.

FIG. 4 shows a simplified schematic diagram of the apparatus of the present invention for controlling make-up of the tubular connections. The control apparatus 30 may be used at any number of suitable locations such as pipe yards, wells or drilling rigs, test sites, etc. As illustrated, the control apparatus 30 comprises a power tong device 32 which is operatively coupled to second pipe section or coupler 14 and adapted to rotate coupler 14. Power tong device 32 also includes a drive motor and control 34 to provide power to rotate coupler 14 and control the speed and amount of rotation thereof. It will be appreciated that the drive motor may be operated by hydraulic pressure, air pressure, electrical power, etc. Also included is an electronic feedback device 36, such as an optical or revolution encoder, which provides a signal to interface circuitry 37 via cable 39 to indicate the rotational position of coupler 14. Backup tool or clamp 40 is removeably attached to first pipe section 10 to prevent first pipe section 10 from rotating as coupler 14 is rotated onto first pipe section 10 by power tongs 32. Strain gauge 42 is operatively attached to backup tool or clamp 40 to provide an output signal to interface circuitry 37, via cable 44, which output signal is proportional to the torque applied to the tubular joint of first pipe section 10 and coupler 14 as the coupler 14 is rotated by power tongs 32.

Interface circuitry 37 includes conventional circuitry to change the form and/or format of the signals received from the electronic feedback device 36 and the strain gauge 42 so those changed signals, which are input to computer 38 via cable 41, are compatible with the input requirements of computer 38. Interface circuitry 37 also includes a digital display, visual indicators such as red and green lights and an audible alarm. When the make-up operation is completed, the digital display provides a message that the make-up is either GOOD or BAD. The audible alarm sounds when the make-up operation is completed so the operator will know that the make-up operation has stopped. The green light is turned on when the computer determines that the make-up operation is ready to start. The red light is turned on when the make-up operation is completed regardless of whether it is a good or bad make-up.

Also connected to computer 38, through interface circuitry 47, are linear measurement devices 46 and 48 such as digital calipers, infrared sensors, linear displacement transducers, lasers or any other suitable electronic device for providing linear measurements, in digital form, as inputs to interface circuitry 47. The outputs of interface circuitry 47 are provided as inputs to computer 38. Interface circuitry 47 includes conventional circuitry to change the form and/or format of the signals received from the digital calipers 46 and 48 so those changed signals are compatible with the input requirements of computer 38.

A keyboard 50 is operatively connected to computer 38 as well as a visual display 52 such as a printer, CRT monitor, etc. Computer 38 may comprise any suitable general purpose programmable digital computer such as a personal computer, a lap-top computer, a mini-computer, a main frame, etc., which includes the normal operating components such as a CPU 54, I/O interface 56, memory 58, etc.

Figure 5A:
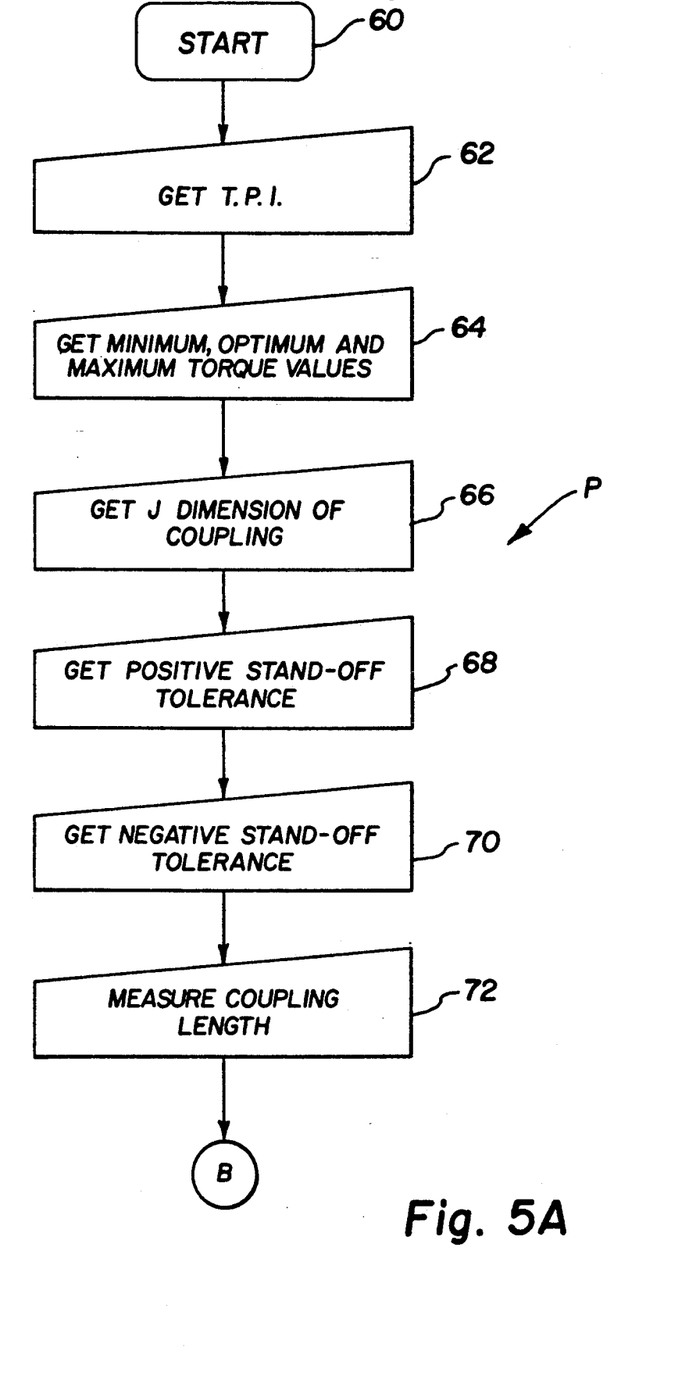
FIGS. 5A, 5B and 5C are simplified schematic flow diagrams for the operation of the apparatus of FIG. 4 to achieve the desired results of the present invention.
Figure 5B:
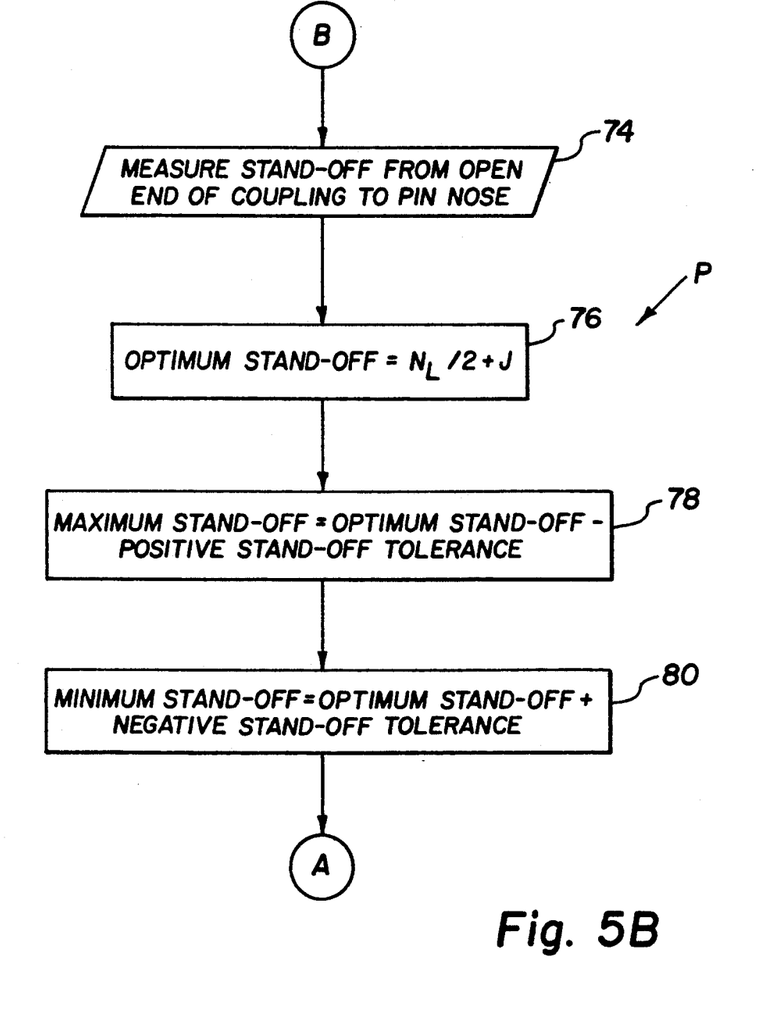
Figure 5C:
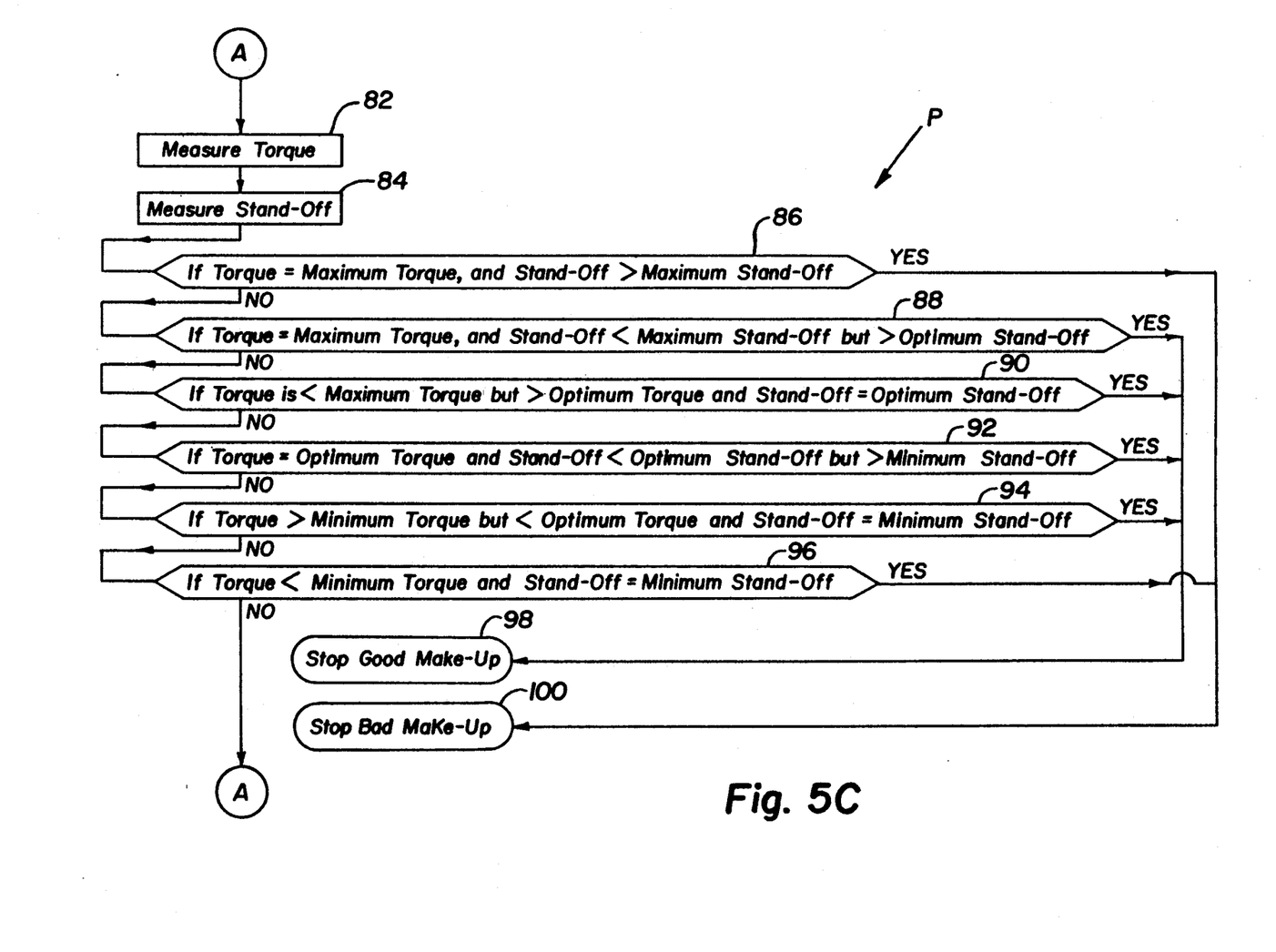

FIGS. 5A, 5B and 5C illustrate program P which is a desired ordered sequence of steps for controlling the make-up of tubular connections by causing the control apparatus 30 to provide and monitor applied torque to the tubular joint while also monitoring stand-off until the tubular joint obtains proper stand-off at proper make-up torque. The program P sets forth, in flow chart form, sufficient information to enable a competent computer programmer of ordinary skill in the computer programming art to program a general purpose digital computer to provide control to control apparatus 30 for controlling the make-up of tubular connections.

Operation of the present invention is illustrated in FIGS. 4, 5A, 5B and 5C. First, the threads of first pipe section 10 and second pipe section or coupler 14 are cleaned and then covered with API Modified Thread Compound (see API Bulletin 5a2) to lubricate and provide solids to fill the voids within joining threads. The second pipe section or coupler 14 is then threadably rotated onto first pipe section 10 to a hand-tight position. Second pipe section or coupler 14 is operatively positioned in power tongs 32 and backup tool or clamp 40 is operatively positioned around first pipe section 10 to prevent rotation thereof.

When program P, which is in memory 58, is selected to be run, the program P enters step 60 (START) and proceeds to step 62 which prompts the operator to input the T.P.I. (Threads per Inch) of the coupler 14 and first pipe section 10 positioned for make-up. The value for the Threads per Inch is found in API Bulletin 5a5, which is hereby incorporated by reference as though fully set forth herein. After the proper value of Threads per Inch is input to computer 38 via the keyboard 50 or other suitable input device, program P proceeds to step 64 which prompts the operator to input the minimum, optimum and maximum torque values for the present tubular joint. The torque values can be found in API Bulletin 5C1 or may be torque values which are supplied by a customer and which may be different from the torque values in the API Bulletin. After the torque values are input to computer 38, the program proceeds to step 66 which prompts the operator to input the J dimension for the second pipe section or coupler 14. The J dimension is found in API Bulletin 5a5 and is the value of the distance from the pin end of the first pipe section 10 to the center of the second pipe section or coupler 14 at power tight make-up. It will be appreciated that power tight make-up refers to the relative positions of the first pipe section 10 and second pipe section or coupler 14 when they form a properly made up tubular joint. After inputting the J dimension into computer 38, the program proceeds to step 68 which prompts the operator to input the positive stand-off tolerance. The positive and negative stand-off tolerances for round threads are found in API Bulletin RP5C1-d and in Standard 5B for buttress threads. After inputting the positive stand-off tolerance to computer 38, the program proceeds to step 70 which prompts the operator to input the negative stand-off tolerance. After inputting the negative stand-off tolerance to computer 38, the program proceeds to step 72 which prompts the operator to input the measured length of second pipe section or coupler 14. The operator uses digital calipers 46 to measure the length of coupler 14 and input same to computer 38. The program then proceeds to step 74 which prompts the operator to input the value of stand-off measured from the open end of coupler 14 to pin end 24 of first pipe section 10. The operator uses digital calipers 48 to measure the value of stand-off and input same to computer 38. It will be appreciated that the same digital calipers could be used for both measurements without deviating from the concept of the present invention.

In step 76 computer 38 calculates the optimum stand-off value for the tubular joint by use of the formula $O_S = N_L/2 + J$ where $O_S$ equals the optimum stand-off value, $N_L$ equals the length of the second pipe section or coupler 14, and J equals the distance from the open end of the second pipe section or coupler to the center of the second pipe section or coupler at power tight make-up. In step 78 computer 38 calculates the acceptable maximum value of stand-off and, in step 80, calculates the acceptable minimum value of stand-off. In step 82 computer 38 determines the value of torque being applied to the tubular joint between first pipe section 10 and second pipe section or coupler 14 by reading the output of strain gauge 42 and converting that output value to torque. In step 84 computer 38 determines the value of stand-off by reading the output of the electronic feedback device 36 and applying the value of T.P.I. (Threads per Inch).

Steps 86 through 96 are decision steps in which the computer determines whether the made up tubular joint is acceptable or should be rejected based on the torque and stand-off values determined in steps 82 and 84. It will be appreciated that the value of maximum torque is greater than the value of minimum torque and that the value of optimum torque is generally midway between maximum and minimum torque. It will also be appreciated that the value of maximum stand-off is greater than the value of minimum stand-off and that the value of optimum stand-off is generally midway between maximum and minimum stand-off.

In step 86 the query is whether the measured torque is equal to the maximum allowable torque while the stand-off is greater than the maximum allowable stand-off. If the answer is YES, then the flow path is to step 100 and the make-up is stopped because the make-up is determined to be BAD. If the answer is NO, then the flow path is to step 88.

In step 88 the query is whether the measured torque is equal to the maximum allowable torque while the stand-off is less than the maximum allowable stand-off but greater than optimum stand-off. If the answer is YES, then the flow path is to step 98 and the make-up is stopped because the make-up is determined to be GOOD. If the answer is NO, then the flow path is to step 90.

In step 90 the query is whether the measured torque is less than the maximum allowable torque but greater than optimum torque while the stand-off equals optimum stand-off. If the answer is YES, then the flow path is to step 98 and the make-up is stopped because the make-up is determined to be GOOD. If the answer is NO, then the flow path is to step 92.

In step 92 the query is whether the measured torque is equal to the optimum value of torque while the stand-off is less than the optimum stand-off but greater than the minimum stand-off. If the answer is YES, then the flow path is to step 98 and the make-up is stopped because the make-up is determined to be GOOD. If the answer is NO, then the flow path is to step 94.

In step 94 the query is whether the measured torque is greater that the minimum torque but less than the optimum torque while the stand-off equals the minimum allowable stand-off. If the answer is YES, then the flow path is to step 98 and the make-up is stopped because the make-up is determined to be GOOD. If the answer is NO, then the flow path is to step 96.

In step 96 the query is whether the measured torque is less than the minimum allowed torque while the stand-off is equal to the minimum allowed stand-off. If the answer is YES, then the flow path is to step 100 and the make-up is stopped because the make-up is determined to be BAD. If the answer is NO, the flow path is back to step 82 and the decision steps of steps 86 through 96 are repeated until the make-up is stopped either because a GOOD make-up occurs or a BAD make-up occurs.

When make-up is stopped, computer 38 sends a signal to drive motor and control 34 to stop the rotation of second pipe section or coupler 14.

Figure 6:
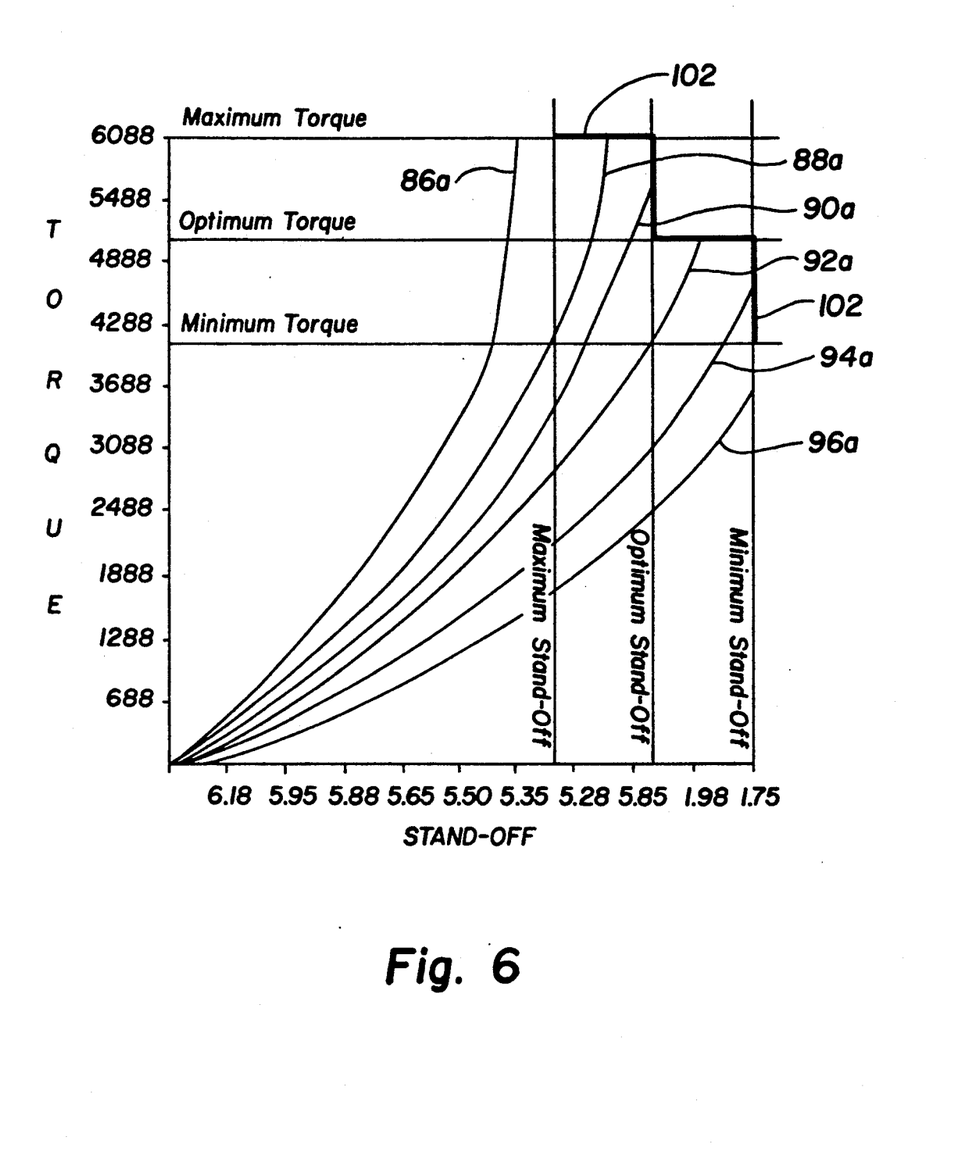
FIG. 6 is a simplified graphic representation of measured torque versus measured stand-off during make-up of tubular connections with the apparatus of FIG. 4.

After make-up is stopped, the computer generates a graphic representation of measured torque versus measured stand-off which occurred during make-up of the tubular joint and displays the representation on visual display 52.

In summary, the values of minimum, optimum and maximum values of allowable torque are input to the computer for the particular pipes which are being made up into a tubular joint. Measured values of $N_L$ and J are input to the computer and the computer then calculates the values of maximum, optimum and minimum values of allowable stand-off for the particular make-up being made. The computer then monitors the values of torque and stand-off during make-up of the tubular joint and terminates make-up when either acceptable values of torque and stand-off have been achieved or the tolerances on the values of torque and stand-off have not been achieved or have been exceeded resulting in a rejected tubular joint. It will be appreciated that the present invention is capable of forming a made up tubular joint having proper stand-off at proper make-up torque by using either published parameters such as those found in API publications or using special parameters supplied by the customer.

FIG. 6 shows the graphic representations which result from YES answers to the queries of decision steps 86 through 96 for a hypothetical make-up in which the coupling length is 9.00 inches (step 72) and the and-tight stand-off is 6.25 inches (step 74). Graphic representation 86a represents the YES response to decision step 86, graphic representation 88a represents the YES response to decision step 88, etc. The graphic representation of FIG. 6 is displayed on visual display 52 (see FIG. 4) when visual display 52 is a CRT monitor and will be printed out as a hard copy when visual display 52 is a printer. It will be appreciated that visual display 52 may comprise both a CRT monitor and a printer.

For each make-up, the optimum torque value and the optimum stand-off value are attempted to be satisfied by program P. If one value (e.g. optimum torque) is met before the other value (e.g. optimum stand-off) is met, the computer 38 will allow additional revolution of the coupler 14 by power tongs 32 in an attempt to arrive at optimum stand-off before maximum allowed values (maximum torque or minimum stand-off) are reached from either torque or stand-off.

With further reference to FIG. 6, an acceptable make-up window (in accordance with American Petroleum Institute standards) is bounded by maximum torque, minimum stand-off, minimum torque and maximum stand-off. The present invention provides a more precise make-up by the operation of program P which limits a good make-up to those values of torque and stand-off which lie on heavy line 102.

Although the invention has been described with reference to a presently preferred embodiment, it will be appreciated by those skilled in the art that various modifications, alternatives, variations, etc., may be made without departing from the spirit and scope of the invention as defined by the appended claims.

What is claimed:

1. The method of connecting a first pipe section and a second pipe section to form a tubular joint make-up having proper stand-off at proper make-up torque comprising the steps of:

providing a first pipe section having a tapered, exteriorly-threaded male end;

providing a second pipe section having a tapered, interiorly-threaded female end;

connecting the first pipe section and the second pipe section by placing said tapered, exteriorly-threaded male end in said tapered, interiorly-threaded female end in a hand-tight position;

measuring the length of the second pipe section;

measuring the distance from the open end of the second pipe section to the end of the tapered, exteriorly-threaded male end of the first pipe section;

calculating the number of turns of the second pipe section required to attain optimum stand-off based on the length and distance measurements of the previous two steps;

providing rotational movement between said first pipe section and said second pipe section;

sensing the torque imposed on the tubular joint of the first pipe section and the second pipe section during said rotational movement;

sensing the number of turns of said rotational movement;

determining that the made up tubular joint is acceptable during said rotational movement when the stand-off is within a predetermined make-up stand-off range while the make-up torque is within a predetermined make-up torque range, or determining that the made up tubular joint should be rejected during said rotational movement when either the stand-off is less than a maximum stand-off value but is outside the predetermined make-up stand-off range while the make-up torque is within the predetermined make-up torque range or the stand-off is within the predetermined make-up stand-off range while the make-up torque is greater than a minimum torque value but is outside the predetermined make-up torque range; and terminating said rotational movement when the tubular joint make-up is determined to be acceptable or to be rejected.

2. The method set forth in claim 1 further including the step of displaying the value of make-up torque versus the value of make-up stand-off which occurred during said rotational movement.

3. The method set forth in claim 1 wherein said predetermined make-up stand-off range includes an optimum stand-off value.

4. The method set forth in claim 3 wherein said optimum stand-off value is determined by the formula $$O_S = N_L/2 + J$$

wherein:
$O_S$ = Optimum stand-off value;
$N_L$ = length of the second pipe section; and
J = distance from the open end of the second pipe section to the center of the second pipe section at the termination of the make-up.

5. The method set forth in claim 1 wherein said first pipe section comprises a predetermined length of tubular pipe.

6. The method set forth in claim 1 wherein said second pipe section comprises a coupling.

7. The method of connecting a coupling to a pin end of a tubular pipe to form a made up tubular joint having proper stand-off at proper make-up torque comprising the steps of:
providing a tubular pipe including a pin end;
providing a coupling;
connecting the tubular pipe and the coupling by placing said pin end in said coupling in a hand-tight position;
measuring the length of the coupling;
measuring the distance from the open end of the coupling to the pin end of the tubular pipe;
calculating the number of turns of the coupling required to attain optimum stand-off based on the length and distance measurements of the previous two steps;
providing rotational movement between said tubular pipe and said coupling;
sensing the torque imposed on the tubular joint of said tubular pipe and said coupling during said rotational movement;
sensing the number of turns of said rotational movement;
determining that said made up tubular joint is acceptable during the rotational movement when the stand-off is within a predetermined make-up stand-off range while the make-up torque is within a predetermined make-up torque range, or
determining that the made up tubular joint should be rejected during said rotational movement when either the stand-off is less than a maximum stand-off value but is outside the predetermined make-up stand-off range while the make-up torque is within the predetermined make-up torque range or the stand-off is within the predetermined make-up stand-off range while the make-up torque is greater than a minimum torque value but is outside the predetermined make-up torque range; and
terminating said rotational movement when the tubular joint make-up is determined to be acceptable or to be rejected.

8. The method set forth in claim 7 further including the step of displaying the value of make-up torque versus the value of make-up stand-off which occurred during said rotational movement.

9. The method set forth in claim 7 wherein said predetermined make-up stand-off range includes an optimum stand-off value.

10. The method set forth in claim 9 wherein said optimum stand-off value is determined by the formula $$O_S = N_L/2 + J$$

wherein:
$O_S$ = Optimum stand-off value;
$N_L$ = length of the second pipe section; and
J = distance from the open end of the second pipe section to the center of the second pipe section at the termination of the make-up.

11. Apparatus for connecting a first pipe section having a tapered, exteriorly-threaded male end and a second pipe section having a tapered, interiorly-threaded female end to form a tubular joint having proper stand-off at proper make-up torque, said first pipe section and said second pipe section having been threadably engaged to a hand-tight position, comprising:
means for measuring the length of the second pipe section;
means for measuring the distance from the open end of the second pipe section to the end of the tapered, exteriorly-threaded male end of the first pipe section;
means for calculating the number of rotational turns of the second pipe section required to attain optimum stand-off based on the length and distance measurements;
means for providing rotational movement between said first pipe section and said second pipe section;
means for sensing the torque imposed on the tubular joint of the first pipe section and the second pipe section during the rotational movement;
means for sensing the number of turns of said rotational movement;
means for determining that the tubular joint is acceptable during the rotational movement when the stand-off is within a predetermined make-up stand-off range while the make-up torque is within a predetermined make-up torque range, or that the made up tubular joint should be rejected during the rotational movement when either the stand-off is less than a maximum stand-off value but is outside the predetermined make-up stand-off range while the make-up torque is within the predetermined make-up torque range or the stand-off is within the predetermined make-up stand-off range while the make-up torque is greater than a minimum torque value but is outside the predetermined make-up torque range; and
means for terminating the rotational movement when the tubular joint is determined to be acceptable or to be rejected.

12. Apparatus as defined in claim 11 further including:
means for displaying the value of make-up torque versus the value of make-up standoff which occurred during the rotational movement.

13. Apparatus as defined in claim 11 wherein said means for measuring the length of the second pipe includes digital calipers.

14. Apparatus as defined in claim 11 wherein said means for calculating the number of turns includes a central processing unit.

15. Apparatus as defined in claim 11 wherein said means for providing continuous rotational movement includes power tongs.

16. Apparatus as defined in claim 11 wherein said means for sensing torque includes a strain gauge.

17. Apparatus as defined in claim 11 wherein said means for determining includes a computer program.

18. Apparatus as defined in claim 15 wherein said means for terminating rotational movement includes means for removing power to the power tongs.

19. Apparatus for connecting a coupling to a pin end of a tubular pipe to form a tubular joint having proper stand-off at proper make-up torque, the coupling and pin end having been threadably engaged to a hand-tight position, comprising:
   a computer;
   digital calipers for measuring the length of the coupling and the distance from the open end of the coupling to the pin end of the tubular pipe operatively coupled to the computer to input the length and distance measurements to the computer;
   a first software program residing in said computer for calculating the number of turns of the coupling required to attain optimum stand-off based on the length and distance measurements;
   power tongs operatively connected to said coupling for providing rotational movement between said tubular pipe and said coupling;
   a strain gauge operatively connected to said tubular pipe for sensing the value of torque imposed on the tubular joint of said coupling and said tubular pipe during the rotational movement, said strain gauge including an output operatively connected to said computer for inputting said value of torque to said computer;
   an electronic feedback device operatively connected to said power tongs to sense the number of turns of said rotational movement, said electronic feedback device including an output operatively connected to said computer for inputting said number of turns to said computer;
   a second software program residing in said computer for determining that the made up tubular joint is acceptable during the rotational movement when the stand-off is within a predetermined make-up stand-off range while the make-up torque is within a predetermined make-up torque range, or that the made up tubular joint should be rejected during the rotational movement when either the stand-off is less than a maximum stand-off value but is outside the predetermined make-up stand-off range while the make-up torque is within the predetermined make-up torque range or the stand-off is within the predetermined make-up stand-off range while the make-up torque is greater than a minimum torque value but is outside the predetermined make-up torque range; and
   means for terminating the rotational movement when the make-up tubular joint is determined to be acceptable or to be rejected.

20. In combination:
   a computer;
   apparatus for connecting a coupling to a pin end of a tubular pipe to form a tubular joint having proper stand-off at proper make-up torque, said coupling and said pin end having been threadably engaged to a hand-tight position, comprising:
   means for measuring the length of the coupling and inputting said length into said computer;
   means for measuring the distance from the open end of the coupling to the pin end of the tubular pipe and inputting said distance into said computer;
   means for calculating the number of turns of the coupling required to attain optimum stand-off based on the length and distance measurements;
   means for providing rotational movement between the tubular pipe and the coupling;
   means for sensing the value of torque imposed on the tubular joint of said coupling and said tubular pipe during the rotational movement and inputting said value of torque into said computer;
   means for sensing the number of turns of said rotational movement and inputting said number of turns into said computer;
   means in said computer for determining that the tubular joint is acceptable during the rotational movement when the stand-off is within a predetermined make-up stand-off range while the make-up torque is within a predetermined make-up torque range, or that the made up tubular joint should be rejected during the rotational movement when either the stand-off is less than a maximum stand-off value but is outside the predetermined make-up stand-off range while the make-up torque is within the predetermined make-up torque range or the stand-off is within the predetermined make-up stand-off range while the make-up torque is greater than a minimum torque value but is outside the predetermined make-up torque range, and
   means for terminating the rotational movement when the tubular joint is determined to be acceptable or to be rejected.

21. Apparatus as defined in claim 20 further including:
   means for displaying the value of make-up torque versus the value of make-up stand-off which occurred during the rotational movement.

22. Apparatus as defined in claim 20 wherein said means for measuring the length of the coupling includes digital calipers.

23. Apparatus as defined in claim 20 wherein said means for calculating the number of turns includes a software program.

24. Apparatus as defined in claim 20 wherein said means for providing rotational movement includes power tongs.

25. Apparatus as defined in claim 20 wherein said means for sensing torque includes a strain gauge.

26. Apparatus as defined in claim 20 wherein said means for determining includes a software program.

27. Apparatus as defined in claim 24 wherein said means for terminating the rotational movement includes means for removing power to the power tongs.

* * * * *